(12) United States Patent
Kipp

(10) Patent No.: US 9,273,453 B2
(45) Date of Patent: Mar. 1, 2016

(54) DRAIN CLEAN-OUT ASSEMBLY AND METHOD OF USING

(76) Inventor: Brian Michael Kipp, Valparaiso, IN (US)

( * ) Notice: Subject to any disclaimer, the term of this patent is extended or adjusted under 35 U.S.C. 154(b) by 839 days.

(21) Appl. No.: 13/611,961

(22) Filed: Sep. 12, 2012

(65) Prior Publication Data

US 2013/0239315 A1    Sep. 19, 2013

Related U.S. Application Data

(63) Continuation-in-part of application No. 12/195,736, filed on Aug. 21, 2008, now Pat. No. 8,286,275.

(60) Provisional application No. 60/957,081, filed on Aug. 21, 2007, provisional application No. 61/017,213, filed on Dec. 28, 2007.

(51) Int. Cl.
| E03D 9/00 | (2006.01) |
| E03C 1/304 | (2006.01) |
| E03C 1/12 | (2006.01) |
| F16K 43/00 | (2006.01) |
| F16L 55/11 | (2006.01) |

(52) U.S. Cl.
CPC . *E03C 1/304* (2013.01); *E03C 1/12* (2013.01); *F16K 43/00* (2013.01); *F16L 55/1108* (2013.01)

(58) Field of Classification Search
CPC .............. E03C 1/30; E03C 1/302; E03D 9/00
USPC ......................................................... 4/255.01
See application file for complete search history.

(56) References Cited

U.S. PATENT DOCUMENTS

| 2,241,560 A | * | 5/1941 | Schouler | ................ F16L 45/00 138/89 |
| 2,451,051 A | * | 10/1948 | Tubbs | ..................... E03F 9/002 138/89 |
| 2005/0283890 A1 | * | 12/2005 | Schaaf | ..................... E03C 1/30 4/255.01 |

* cited by examiner

*Primary Examiner* — Huyen Le
(74) *Attorney, Agent, or Firm* — Hartman Global IP Law; Gary M. Hartman; Domenica N. S. Hartman

(57) ABSTRACT

Drain clean-out assemblies that can be used to drain the contents of a drain line prior to removing a clean-out plug mounted to the assembly or to which the assembly is mounted. The drain clean-out assembly includes clean-out plug and a device for selectively preventing and permitting drainage of a fluid through a drain port of the assembly. The assembly may include a housing having oppositely-disposed first and second ends, wherein the first end of the housing is configured to attach to a drain line, the second end of the housing is a clean-out port, the clean-out plug is removably attached to the clean-out port, and the drain port is defined by and through the clean-out plug and in fluidic communication with an interior of the housing.

14 Claims, 10 Drawing Sheets

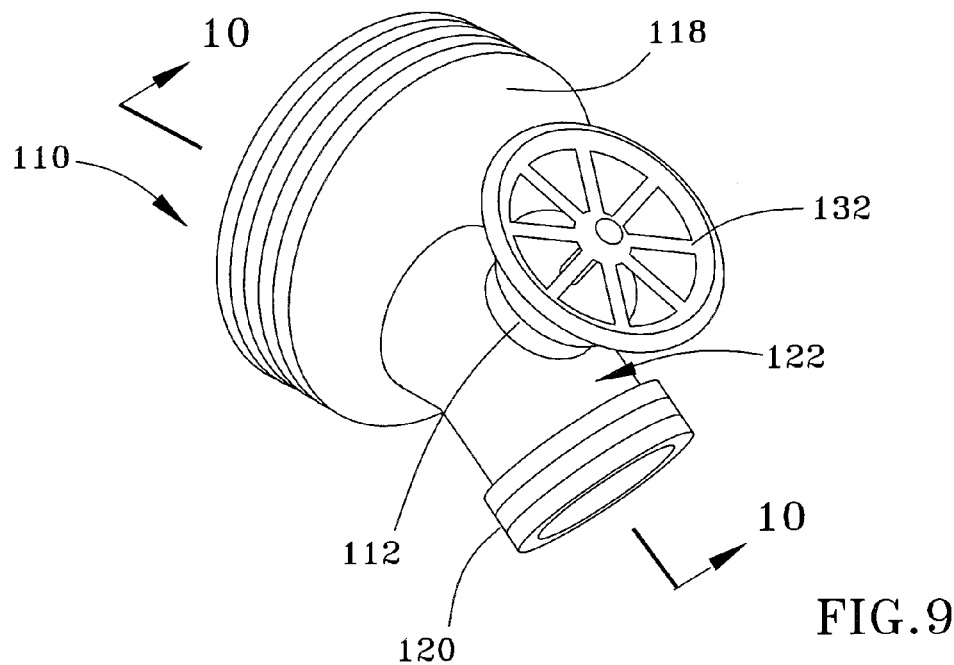
FIG. 9
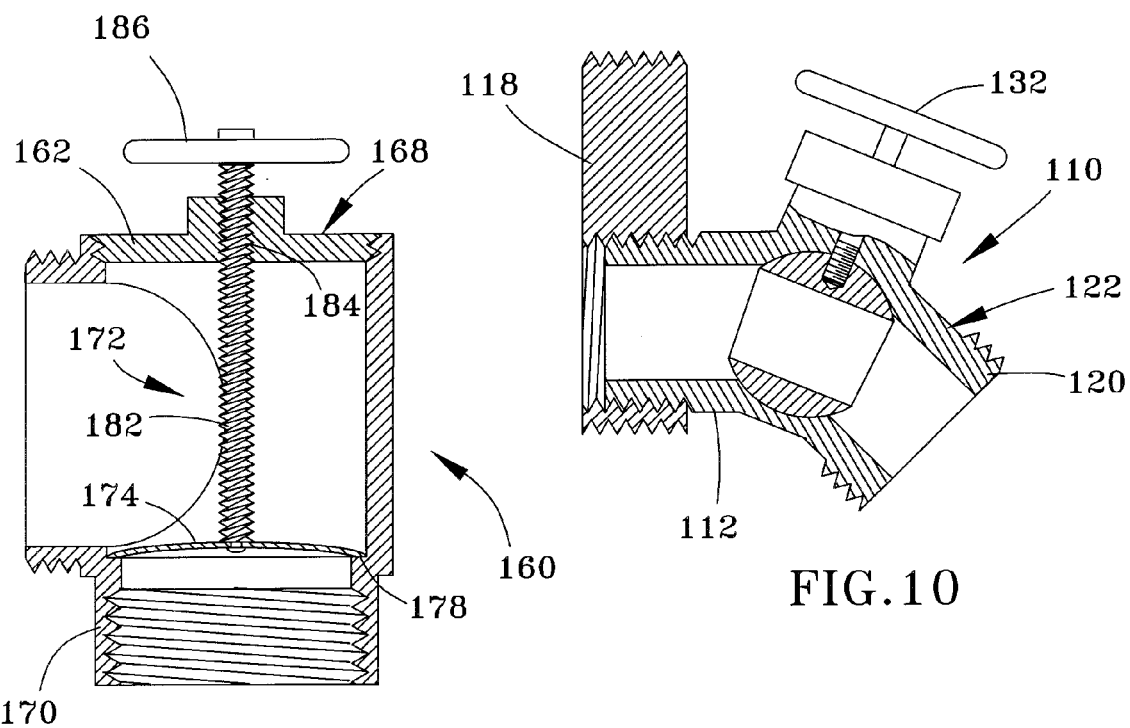
FIG. 10
FIG. 11

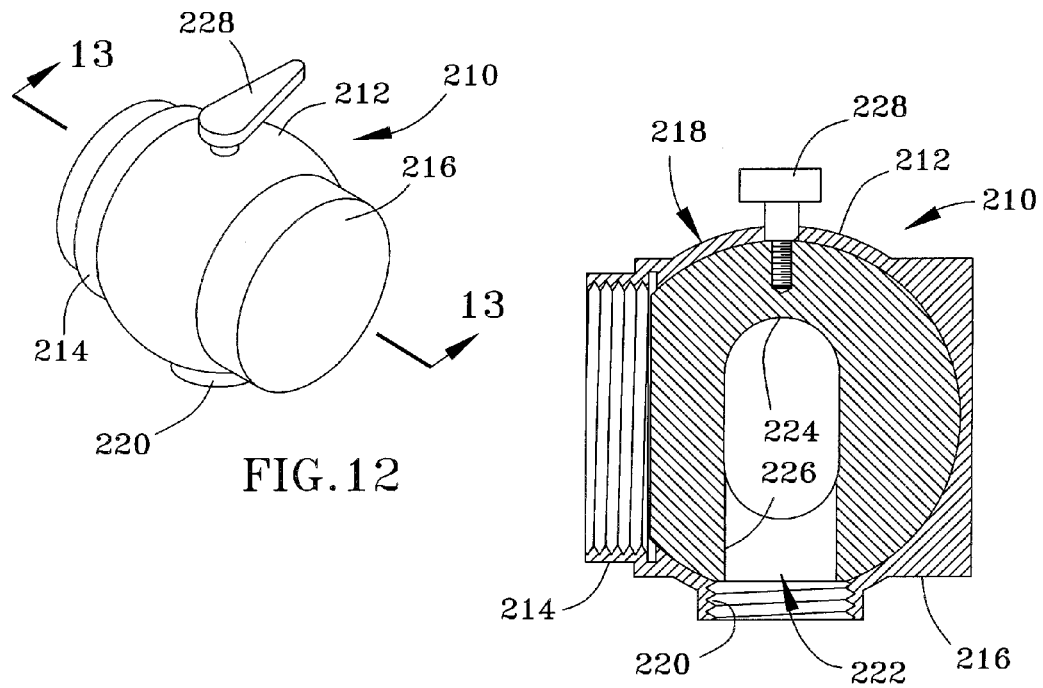
FIG. 12
FIG. 13
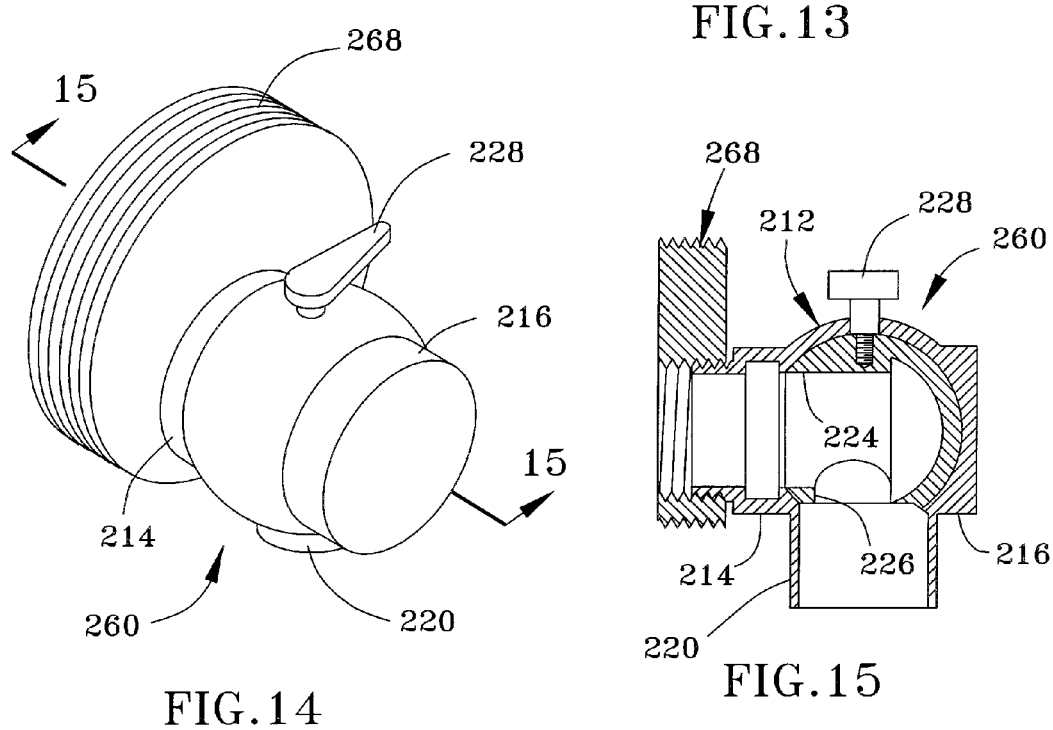
FIG. 14
FIG. 15

DRAIN CLEAN-OUT ASSEMBLY AND METHOD OF USING

CROSS REFERENCE TO RELATED APPLICATIONS

This is a continuation-in-part patent application of co-pending U.S. patent application Ser. No. 12/195,736, filed Aug. 21, 2008, which claimed the benefit of U.S. Provisional Application No. 60/957,081, filed Aug. 21, 2007, and U.S. Provisional Application No. 61/017,213, filed Dec. 28, 2007. This application is also related to U.S. Provisional Application No. 61/496,220, filed Jun. 13, 2011. The contents of these prior applications are incorporated herein by reference.

BACKGROUND OF THE INVENTION

The present invention generally relates to plumbing equipment, and more particularly problems associated with cleaning a plugged sewage drain line, for example, found in a residential and commercial buildings.

If a sewage drain line becomes obstructed in, for example, a residential or commercial building, the blockage is typically removed with a rod or cable inserted through a clean-out fitting located in the drain line above the obstruction. However, as soon as the clean-out plug is removed, backed-up sewage above the obstruction and clean-out fitting rapidly drains from the drain line through the fitting as a plug of the fitting is removed, often resulting in a spill that must be cleaned.

U.S. Pat. No. 2,241,560 to Schouler, U.S. Pat. No. 2,451,051 to Tubbs, U.S. Pat. No. 4,159,721 to Horter, U.S. Pat. No. 5,144,699 to Graham, and U.S. Published Patent Application No. 2005/0283890 to Schaaf are each concerned with draining a drain system prior to attempting to remove an obstruction. Schouler discloses a valve between a drain system and a clean-out plug, and through which sewage can drain to a hose. Tubbs also discloses the use of a valve between a drain system and a clean-out plug assembly, though with the intent that sewage is prevented from being drained prior to and during removal of an obstruction. Horter differs in that a drain hose is attached downstream from a clean-out plug of a drain system. Graham discloses a drain hose attached downstream of a valve that operates as a drain plug on a drain system. Schaaf discloses a drain valve that, while located downstream of a drain plug, enables a drain system to be drained without removing the plug.

BRIEF DESCRIPTION OF THE INVENTION

The present invention provides drain clean-out assemblies that can be used to drain the contents of a drain line prior to removing a clean-out plug mounted to the assembly, or to which the assembly is mounted.

According to a first aspect of the invention, the drain clean-out assembly includes a housing having oppositely-disposed first and second ends and a drain between the first and second ends and in fluidic communication with an interior of the housing. The first end of the housing is configured to attach to a drain line, and a clean-out plug is removably attached to the housing. A device is contained within the housing for selectively preventing and permitting flow of a fluid into the housing from the first end thereof and out of the housing through the drain thereof. A device accessible outside the housing permits operation of the preventing and permitting device.

According to a second aspect of the invention, the drain clean-out assembly includes a clean-out plug and a device permanently mounted to the clean-out plug for selectively preventing and permitting drainage of a fluid through the clean-out plug. The preventing and permitting device may be, for example, a flapper assembly, a spigot, a three-way ball valve, or a plunger assembly, within the housing.

According to further aspects of the invention, a method is provided for draining an obstructed drain line to permit removal of an obstruction in the drain line. The method generally entails mounting to a drain line a drain clean-out assembly that includes a device for selectively preventing and permitting flow of a fluid from a first end of a housing of the assembly to a drain of the assembly. The device is then operated to drain sewage within the drain line upstream of (above) the obstruction and the drain clean-out assembly, after which a clean-out plug associated with the assembly is removed to gain access to and remove the obstruction through an access in the housing.

In view of the above, the drain clean-out assembly enables the draining of a plugged drain line upstream of (above) the obstruction prior to attempting to remove the obstruction itself. As a result, a cable or rod can be inserted into the drain line through a clean-out fitting without risk of sewage spilling out as the clean-out plug is being removed. Other objects and advantages of this invention will be better appreciated from the following drawing descriptions.

BRIEF DESCRIPTION OF THE DRAWINGS

FIGS. 9 and 10 are perspective and cross-sectional views, respectively, of a spigot-type drainable clean-out assembly for a drain stack in accordance with a fifth embodiment of the invention.

FIG. 11 is a cross-sectional view of a plunger-type drainable clean-out assembly in accordance with a sixth embodiment of the invention.

FIGS. 12 and 13 are perspective and cross-sectional views, respectively, of a ball valve-type drainable clean-out assembly in accordance with a seventh embodiment of the invention.

FIGS. 14 and 15 are perspective and cross-sectional views, respectively, of a ball valve-type drainable clean-out assembly in accordance with an eighth embodiment of the invention.

DETAILED DESCRIPTION OF THE INVENTION

FIGS. 1 through 15 depict configurations of drainable clean-out assemblies in accordance with embodiments of this invention. In each embodiment, the assembly is configured to be mounted to a drain line (or stack), and is equipped with a clean-out plug and a drain valve for safely draining sewage from a drain line before attempting to place a rod or cable into the drain line to remove a blockage. In the figures, consistent reference numbers are used to identify functionally similar structures of related embodiments. It should be further noted that the drawings are drawn for purposes of clarity when viewed in combination with the following description, and therefore are not necessarily to scale.

Figure 1:
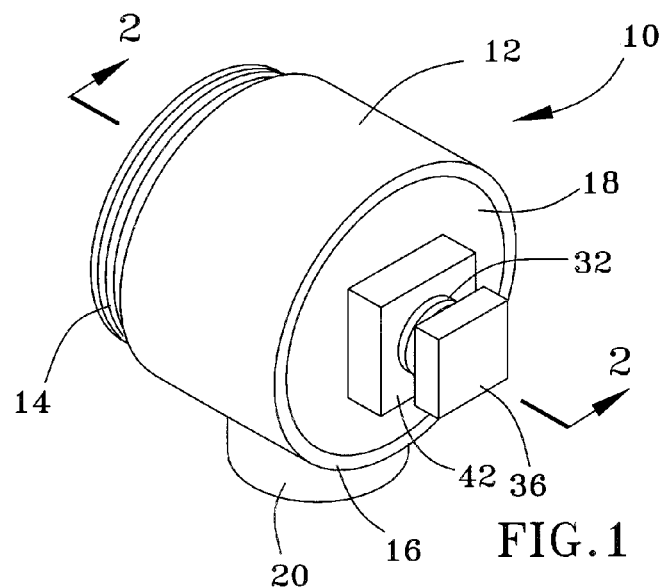
FIGS. 1 and 2 are perspective and cross-sectional views, respectively, of a plunger-type drainable clean-out assembly in accordance with a first embodiment of the invention.
Figure 2:
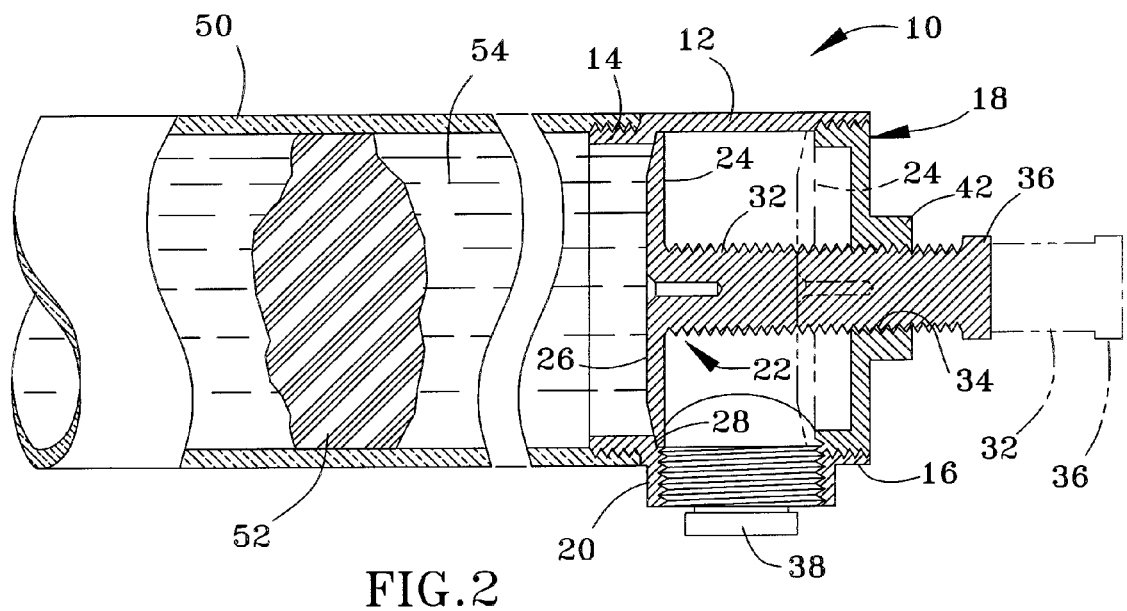
Figure 3:
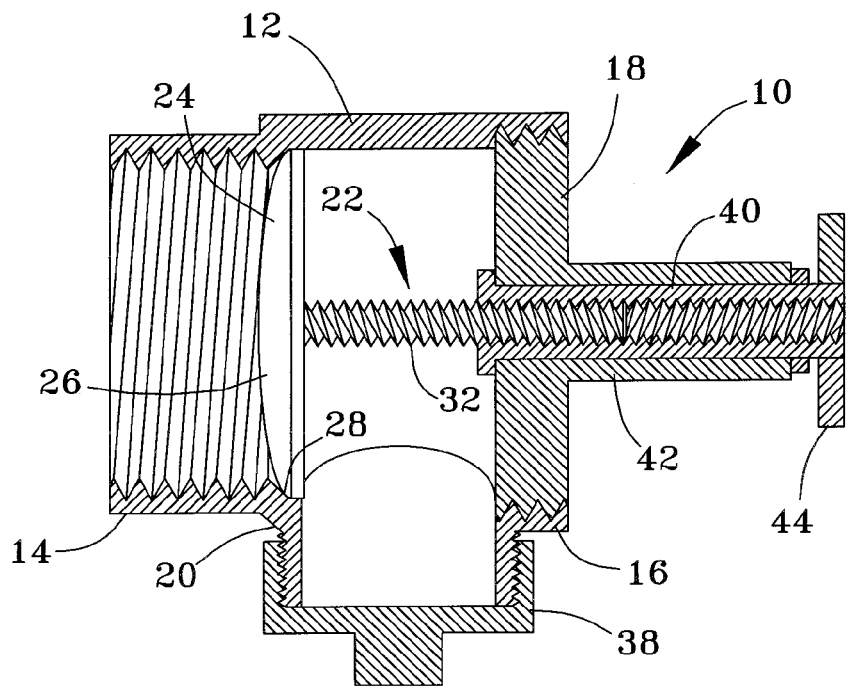
FIGS. 3 and 4 are cross-sectional views of plunger-type drainable clean-out assemblies in accordance with second and third embodiments of the invention.
Figure 4:
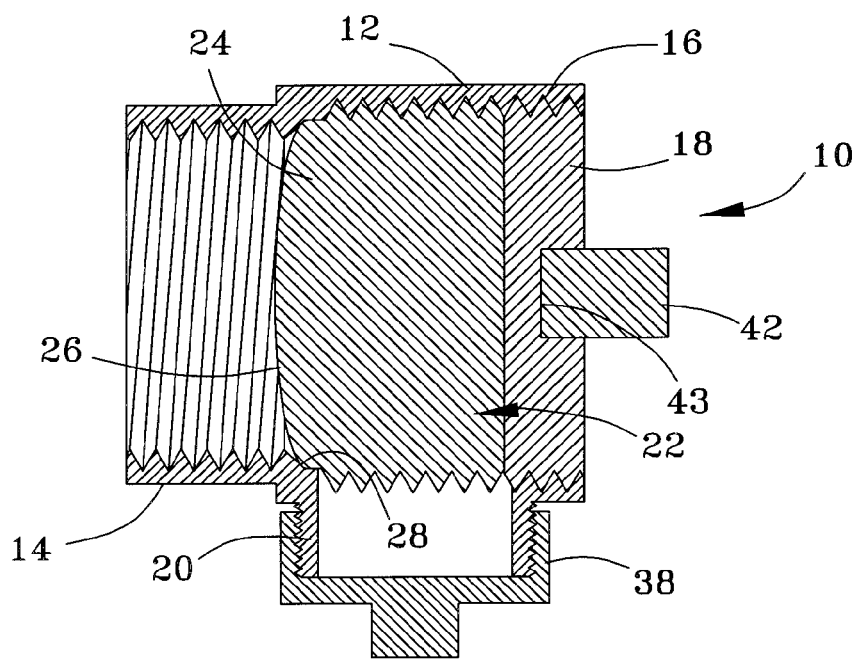

FIGS. 1 and 2 represent an embodiment of a plunger-type clean-out assembly 10 of this invention, and FIGS. 3 and 4 represent two additional embodiments of plunger-type clean-out assemblies 10 similar in function and operation to the embodiment of FIGS. 1 and 2. FIG. 2 further shows the assembly 10 of FIG. 1 mounted to a sewer line 50 in which an obstruction 52 is present. The assemblies 10 are typically located at or near an end of the sewer line 50 below drain pipes (not shown) that enter the sewer line 50 from above. In a conventional plumbing system, a clean-out plug would be employed to close the end of the sewer line 50 instead of the assembly 10 of this invention.

The clean-out assemblies 10 if FIGS. 1 through 4 enable the obstruction 52 to be removed from the sewer line 50, while avoiding sewage 54 upstream of (above) the obstruction 52 from pouring out of the line 50 when the line 50 is opened to permit insertion of a rod or cable (not shown) to remove the obstruction 52. In FIGS. 1 through 4, the assembly 10 comprises a generally cylindrical-shaped housing 12 having oppositely-disposed axial ends, one of which is a mounting end 14 adapted to secure the assembly 10 to the sewer line 50, while the other is a clean-out end 16 equipped with a clean-out plug 18. The mounting end 14 is shown equipped with threads that permit mounting the assembly 10 on the drain line 50, though an adhesive, clamp, expansion seal, or other mounting technique could be used instead. At a lower side of its circumference, the housing 12 is equipped with a drain 20 whose axis is oriented generally as a radial to the axis of the housing 12.

The assemblies 10 of FIGS. 1 through 4 further include a plunger assembly 22 with a piston 24 slidably disposed within the housing 12. The piston 24 has a convex face 26 shaped to abut and seal against an annular-shaped tapered seat 28 defined at the junction between the mounting end 14 of the housing 12 and the main body of the housing 12. In this manner, the piston 24 is capable of sealing the sewage 54 within the drain line 50 and preventing its entry into the housing 12.

In FIGS. 1 and 2, the plunger assembly 22 further includes a stem 32 that threads through a threaded bore 34 in the clean-out plug 18. A nut 36 affixed to the stem 32 enables the stem 32 to be turned and threaded out through the plug 18, thereby backing the piston 24 off the seat 28 to permit the sewage 54 to enter the housing 12. The threaded engagement of the stem 32 and clean-out plug 18 effectively forms a seal to prevent leakage of sewage 54. It is foreseeable that the threads could be omitted, and the stem 32 and bore 34 could have a sliding fit therebetween that could be sealed with o-rings or another suitable sealing element. In the absence of threads, the assembly 10 would preferably be equipped with a spring or other element capable of biasing the piston 24 into engagement with the seat 28.

The embodiments of FIGS. 3 and 4 differ primarily by the configuration of the plunger assembly 22. In FIG. 3, the plunger assembly 22 further includes a threaded cylinder 40 within a boss 42 on the clean-out plug 18. By turning the cylinder 40 with a handle 44, the plunger assembly 22 is retracted in the housing 12 essentially in the same manner as that seen in FIG. 2. In FIG. 4, the plunger assembly 22 can be a solid or hollow body attached to or otherwise formed as a fixed extension of the clean-out plug 18, such that rotating the plug 18 (for example, using a wrench on the boss 42) to partially retract the plunger assembly 22 within the housing 12 also rotates the plunger assembly 22, thereby unseating the piston 24 and its convex face 26 from the seat 28 for draining the sewage 54.

In each of FIGS. 1 through 4, the drain 20 is equipped with a drain plug 38 that can be removed prior to releasing the sewage 54 from the drain line 50, so that the sewage 54 can safely drain from the housing 12 into a hose (not shown) or other conduit threaded into or otherwise attached to the drain 20. Once the sewage 54 has been drained from the housing 12 through the drain 20, the clean-out plug 18 (along with the plunger assembly 22) can be removed from the housing 12 to permit the insertion of a rod or cable through the clean-out end 16 of the housing 12 to remove the obstruction 52. The housing 12 can remain on the drain line 50, enabling continued use of the drain 20 (and any conduit attached thereto) to remove sewage 54 from the drain line 50 as the obstruction 52 is being removed and sewage is displaced by the rod/cable.

While each clean-out plug 18 in FIGS. 1 through 4 is shown with male threads that thread into female threads within the clean-out end 16 of the housing 12, those skilled in the art will appreciate that the plug 18 could be equipped with female threads that thread onto male threads on the circumference of the clean-out end 16. Furthermore, while a male boss 42 is shown for turning the plug 18, the end of plug 18 could be countersunk with a feature (for example, 43 in FIG. 4) to permit the use of a ratchet, screwdriver, or any other suitable tool to rotate the plug 18 and eventually remove it from the housing 12.

Figure 5:
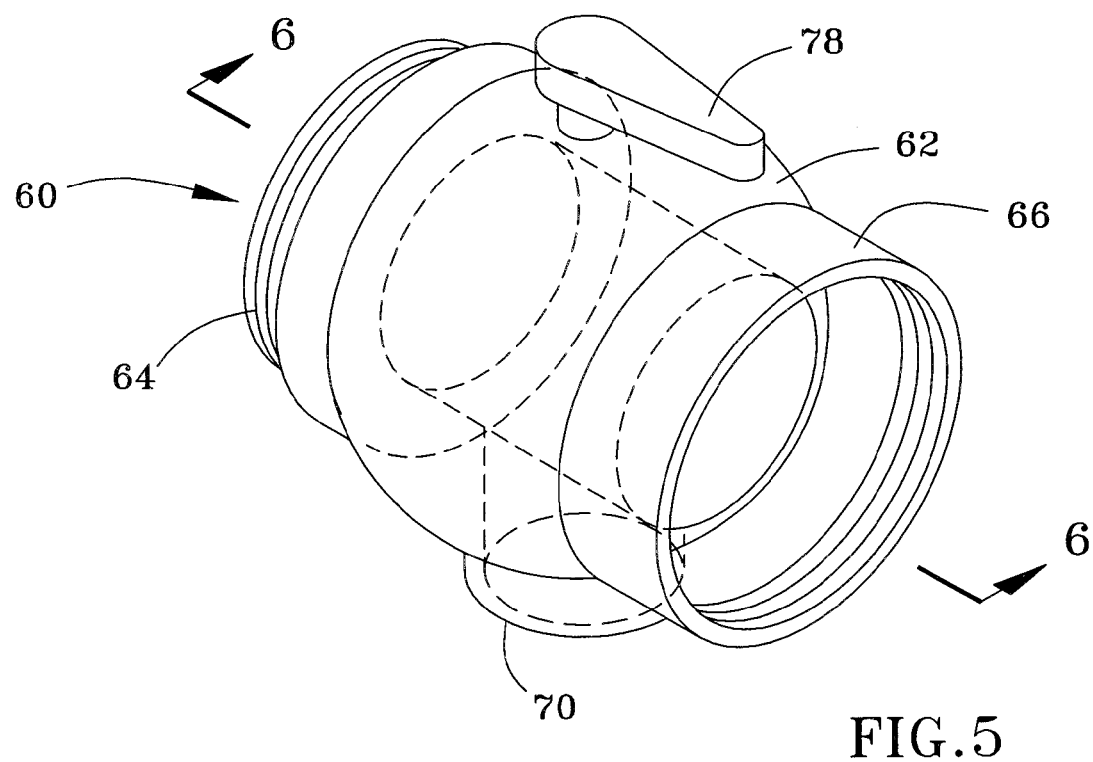
FIGS. 5 and 6 are perspective and cross-sectional views, respectively, of a ball valve-type drainable clean-out assembly in accordance with a fourth embodiment of the invention.
Figure 6:
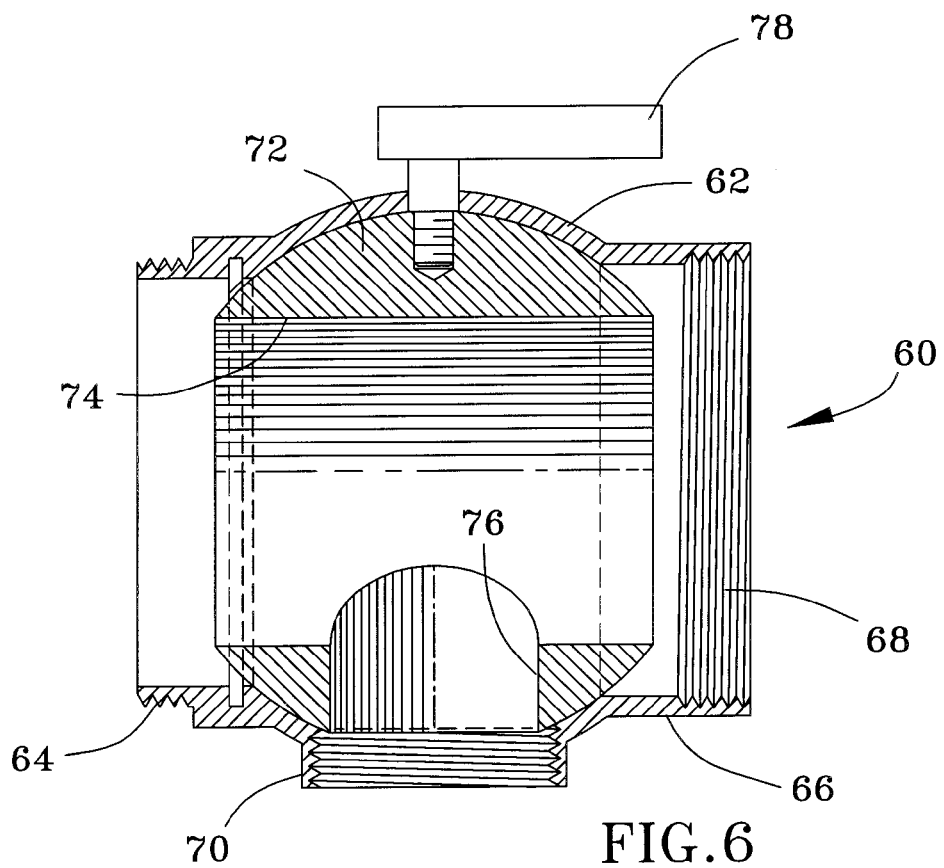

FIGS. 5 and 6 represent an embodiment of a ball valve-type clean-out assembly 60 of this invention. Similar to the embodiments of FIGS. 1 through 4, the assembly 60 is adapted to be mounted to a sewer line (for example, 50 in FIG. 2). The assembly 60 comprises a generally cylindrical-shaped housing 62 having oppositely-disposed axial ends, one of which is a mounting end 64 adapted to secure the assembly 60 to the sewer line while the other is a clean-out end 66 equipped with a clean-out plug 68. Similar to the embodiments of FIGS. 1 through 4, the mounting end 64 can be equipped with threads that permit mounting the assembly 60 on a drain line, and the housing 62 is equipped with a drain 70 located at a lower side of its circumference. The drain 70 can be closed with a drain plug (not shown), similar to FIGS. 1 and 2.

The primary difference between the assembly 60 of FIGS. 5 and 6 and the assemblies 10 of FIGS. 1 through 4 is the use of a three-way ball valve 72 instead of a plunger assembly 22 to regulate the flow of sewage through the assembly 60. The ball valve 72 (shown only in FIG. 6) has a main axial bore 74 and a radial bore 76, the latter of which is coaxial with the rotational axis of the valve 72 and therefore is and remains aligned with the drain 70 throughout the operation of the assembly 60. When the ball valve 72 is closed, the axial bore 74 is oriented transverse to the axis of the housing 62, such that the body of the ball valve 72 closes the mounting end 64, thereby sealing sewage within the drain line and preventing its entry into the housing 62. By turning the ball valve 72 with a handle 78 to align the axial bore 74 with the axis of the housing 62, sewage is able to enter the bore 74 and exit the housing 62 through the radial bore 76 and drain 70. As before, a hose or other conduit can be threaded onto or otherwise attached to the drain 70. Once the sewage has been drained from the housing 62, the clean-out plug 68 can be removed from the housing 62 to permit the insertion of a rod or cable into the drain line through the clean-out end 66 of the housing and the axial bore 74 of the valve 72. The housing 62 can remain on the drain line, enabling continued use of the drain 70 (and any conduit attached thereto) to remove sewage from the drain line as the obstruction is being removed and sewage is displaced by the rod/cable.

Figure 7:
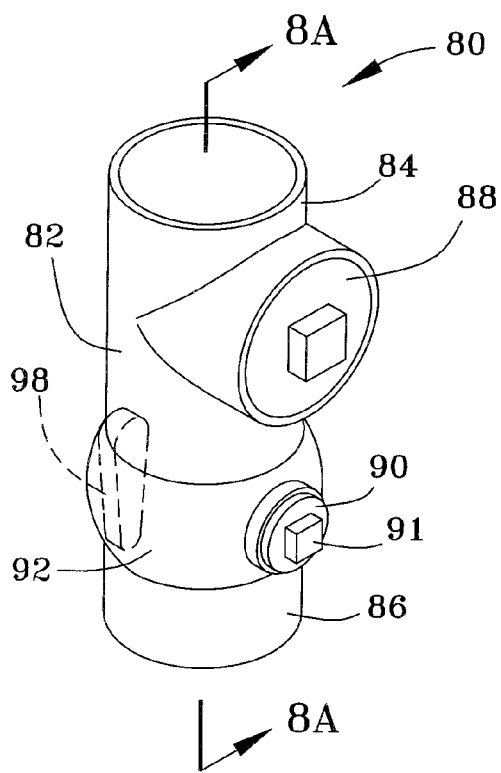
FIG. 7 is a perspective view.
Figure 8A:
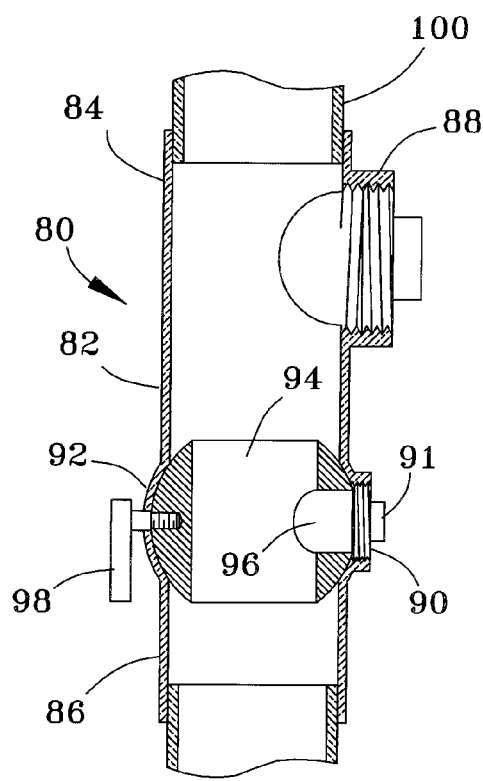
FIGS. 8A, and 8B are cross-sectional views of a ball valve-type drainable clean-out assembly for a drain stack in accordance with a fifth embodiment of the invention.
Figure 8B:
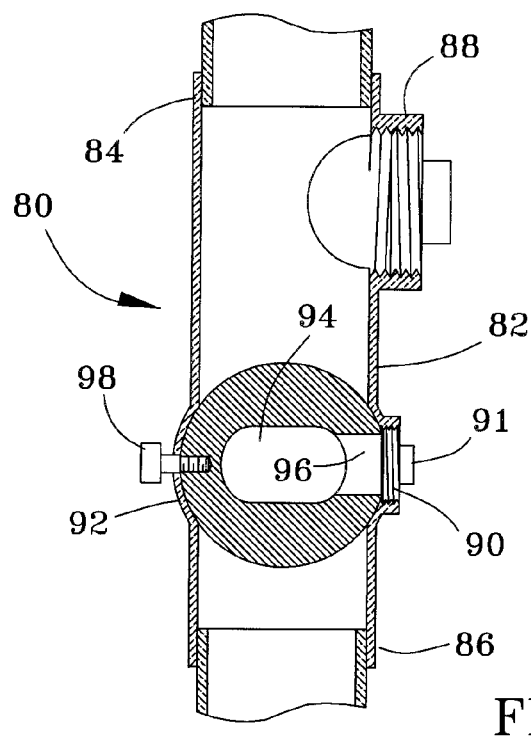
Figure 16:
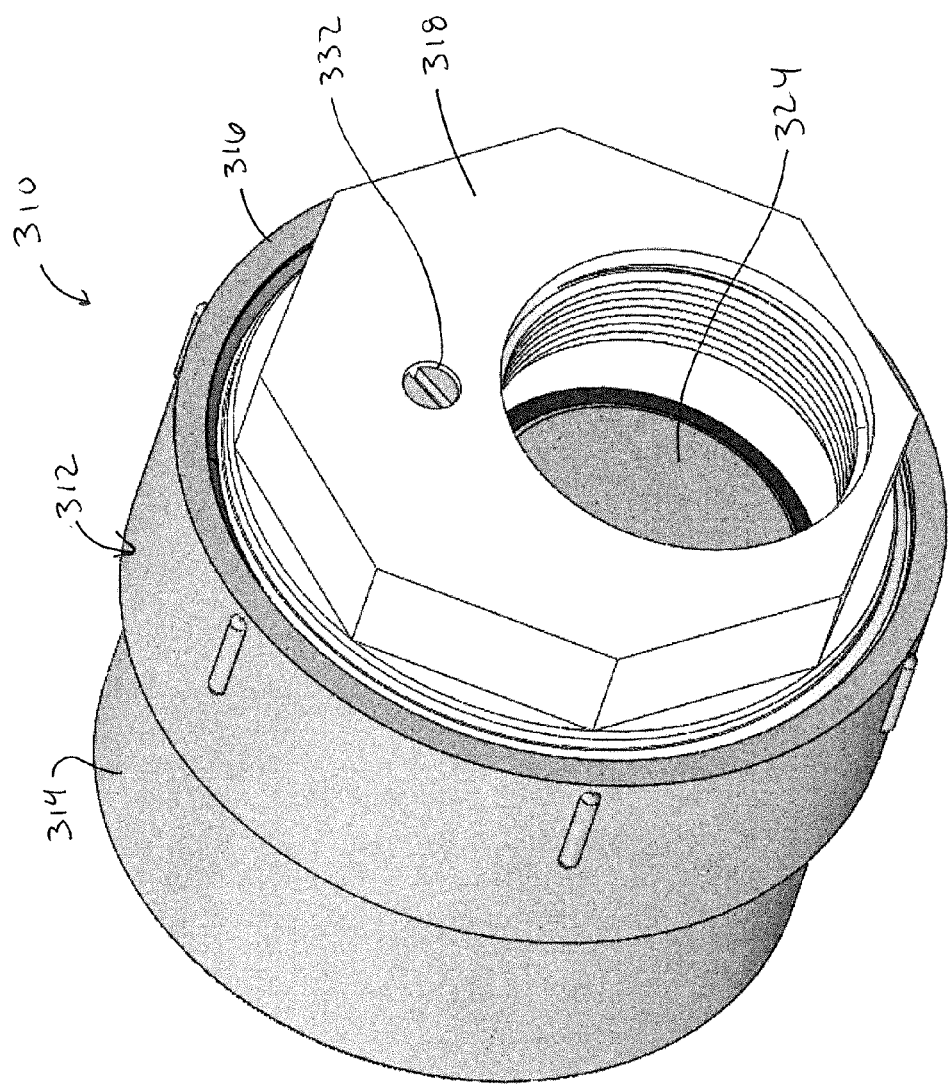
FIGS. 16 through 19 show perspective, end, and cross-sectional views of a flapper-type drainable clean-out assemblies in accordance with a ninth embodiment of the invention.
Figure 17:
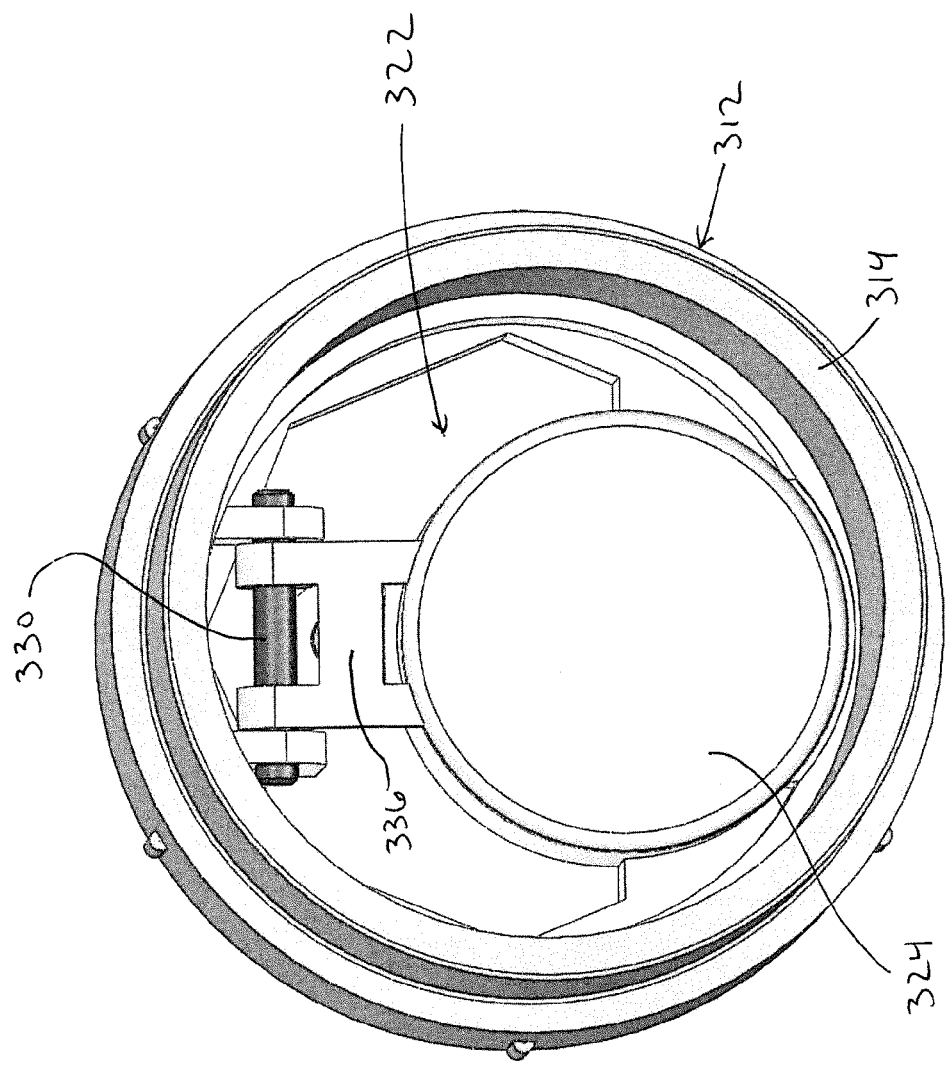

FIGS. 7, 8A and 8B represent the adaptation of a ball valve-type clean-out assembly 80 to a vertical section of a drain stack 100, such as of a type typically found in commercial buildings. Similar to the embodiments of FIGS. 1 through 6, the assembly 80 comprises a generally cylindrical-shaped housing 82 with oppositely-disposed axial ends 84 and 86, both of which are adapted to secure the assembly 80 to the stack 100. Similar to the previous embodiments, the ends 84 and 86 can be attached with threads, clamps, expansion seals, adhesives, etc., to the drain stack 100, and the housing 82 is equipped with a drain 90 located at its circumference. The drain 90 is shown closed with a drain plug 91.

The housing 82 contains a modified three-way ball valve 92 (shown only in FIGS. 8A and 8B) with a main axial bore 94 and a radial bore 96 coaxial with the rotational axis of the valve 92, such that the radial bore 96 is and remains aligned with the drain 90 throughout the operation of the assembly 80. In contrast to the embodiment of FIGS. 5 and 6, the ball valve 92 is normally open (FIG. 8A) during the operation of the plumbing system, with the axial bore 94 oriented in-line with the axis of the housing 82 to permit downward flow of sewage through the housing 82 and into the section of the stack 100 beneath the housing 82. Because sewage is normally present within the drain stack 100 and the housing 82, the radial bore 96 is also filled with sewage under a pressure head from the sewage above the valve 92. As seen in FIG. 8B, by turning the ball valve 92 about ninety degrees with a handle 98, the axial bore 94 is no longer aligned with the axis of the housing 82 and the radial bore 96 is effectively isolated from the sewage above the ball valve 92. Consequently, the drain plug 91 can be removed to permit attachment of a hose or other conduit (not shown) to the drain 90, with any spillage being limited to the small amount within the bores 94 and 96. Thereafter, the ball valve 92 can be returned to the position in FIG. 8A to allow sewage above the valve 92 to flow downwardly through the axial bore 94 and then through the radial bore 96 to exit the housing 82 through the drain 90 and its attached conduit. Once the sewage has been drained from the housing 92 through the drain 90, a clean-out plug 88 located above the valve 92 can be removed from the housing 82 to permit the insertion of a rod or cable into the drain stack 100. During removal of the obstruction, the drain 90 (and any conduit attached thereto) continues to remove sewage from the drain stack 100 as the obstruction is being removed and sewage is displaced by the rod/cable.

The embodiments of FIGS. 9 through 15 differ from the preceding embodiments in part due to the drainage mechanism effectively being a permanent component of a clean-out plug, instead of a clean-out plug being a removable component of the clean-out assembly.

FIGS. 9 and 10 represent a clean-out assembly 110 configured for use as a clean-out or drain plug 118 equipped with a spigot 122 and adapted to be attached (e.g., threaded) to a drain line (e.g., 50 in FIG. 2), such as with threads, clamps, expansion seals, adhesives, etc. The spigot 122 has a drain 120 that is preferably configured to permit the attachment of a garden hose or other suitable conduit. In use, the spigot 122 is simply opened to drain sewage from the sewer line upstream of (above) an obstruction, and once drained the plug 118 (along with the entire spigot 122 mounted thereto) can be removed from the drain line, or a separate clean-out plug upstream of the plug 118 can be removed, to permit the insertion of a cable or rod into the drain line without risk of sewage spilling out as the plug 118 (or the separate clean-out plug) is being removed.

FIG. 11 also represents a clean-out assembly 160 configured for use as a clean-out or drain plug 168. The assembly 160 of FIG. 11 primarily differs from that of FIGS. 9 and 10 by replacing the spigot 122 with a housing 162, drain 170, and plunger assembly 172 mounted transverse to the housing 162. Similar to the plunger-type embodiments of FIGS. 1 through 4, the plunger assembly 172 includes a threaded stem 182 threaded through a threaded bore 184 of the housing 162, and a piston 174 attached to the end of the stem 182 within the housing 162. The piston 174 is adapted to abut and seal against a seat 178 surrounding the drain 170. A slotted head 186 opposite the piston 174 and outside the housing 162 enables the stem 182 to be turned and threaded out through the housing 162, thereby backing the piston 174 off the seat 178 to permit sewage to flow through the housing 162 and drain out through the drain 170. Once the drain line is drained of sewage, the entire plug 168 (including the plunger assembly 172 within) can be removed from the drain line, or a separate clean-out plug upstream of the plug 118 can be removed, to permit the insertion of a cable or rod into the drain line without risk of sewage spilling out as the plug 168 (or the separate clean-out plug) is being removed.

FIGS. 12 through 15 represent clean-out assemblies 210 and 260, respectively, configured for use as clean-out or drain plugs 218 and 268. These assemblies 210 and 260 primarily differ from that of FIG. 11 by replacing the plunger assembly 172 with a three-way ball valve 222. The ball valve 222 is encased in a housing 212 equipped with a drain 220 at its lower edge, with one end 214 of the housing 212 coupled to the plug 218/268 and the opposite end 216 closed. The embodiments of FIGS. 12 and 13 and FIGS. 14 and 15 differ primarily by the size of the housings 212 and their internal components relative to their respective plugs 218 and 268.

Similar to the ball valve-type embodiments of FIGS. 5 and 6, each ball valve 222 has a main axial bore 224 and a radial bore 226, the latter of which is coaxial with the rotational axis of the valve 222 and therefore is and remains aligned with the drain 220 throughout the operation of the assembly 210 and 260. When the ball valve 222 is closed, the axial bore 224 is oriented transverse to the axis of the housing 212, such that the body of the ball valve 222 closes the mounting end 214 of the housing 212, thereby sealing sewage within the drain line and preventing its entry into the housing 212. By turning the ball valve 222 with a handle 228 to align the axial bore 224 with the axis of the housing 212, sewage is able to enter the bore 224 and exit the housing 212 through the radial bore 226 and drain 220. Once the drain line is drained of sewage, the entire plug 218 or 268 (including the ball valve 222 within) can be removed from the drain line, or a separate clean-out plug upstream of the plug 218 or 268 can be removed, to permit the insertion of a cable or rod into the drain line without risk of sewage spilling out as the plug 218 or 268 (or the separate clean-out plug) is being removed.

In the embodiments of FIGS. 1 through 15, conventional plumbing-grade materials can be used to form the components of the assemblies 10, 60, 80, 110, 160, 210 and 260. In FIGS. 1 through 4 and 11, the pistons 24 and 174 or at least their sealing faces 26 and 176 may be formed of rubber or another pliable material.

Finally, FIGS. 16 through 19 show perspective, end, and cross-sectional views of a flapper-type drainable clean-out assembly 310 in accordance with another embodiment of the invention. The assembly 310 of FIGS. 16 through 19 comprises a housing 312, a clean-out plug 318 threaded into the housing 312, and a flapper assembly 322 operated by a threaded member 332. The housing 312 is generally tubular-shaped and has oppositely-disposed axial ends, one of which is a mounting end 314 adapted to secure the assembly 310 to a sewer line (e.g., line 50 in FIG. 2), while the other defines a clean-out port 316 closed by the clean-out plug 318. The mounting end 314 is shown as a male end adapted to mount the assembly 310 to a drain line with adhesive, though a threaded fitting, clamp, expansion seal, or other mounting technique could be used instead. At a lower edge of its circumference, the plug 318 is equipped with a drain port 320 whose axis is oriented generally parallel to the axis of the housing 312. The drain port 320 coincides with the lower edge of the housing 312 to ensure that any sewage within the housing 312 can be drained through the drain port 320 prior to removing the plug 318 from the housing 312.

The flapper assembly 322 is configured as a part of the plug 318, such that the drain clean-out functionality can be entirely embodied in the plug 318, such that the housing 312 can be entirely conventional. The flapper assembly 322 includes a flapper 324 pivotably mounted to the plug 318 with a pivot 330 so as to be pivotably disposed within the housing 312 when the plug 318 is mounted to the housing 312. The flapper 324 has a face 326 oriented and shaped to abut and seal against an annular-shaped seat 328 defined at an interior face surrounding the drain port 320. In this manner, the flapper 324 has a first position in which it is capable of sealing sewage within the housing 312 (and a drain line upstream of the housing 312) and preventing its entry into the drain port 320. In FIGS. 16 through 19, the face 326 is represented as having an annular shape and as including a ring seal, though other configurations are possible and within the scope of the invention. As evident from FIG. 18, the seat 328 lies in a plane that is transverse but not perpendicular to the axis of the plug 318, such that the flapper 324 is not perpendicular when the plug 318 is installed on a drain line and gravity promotes a fluid-tight contact between the flapper 324 and seat 328 to positively promote a fluid-tight seal therebetween.

Figure 18:
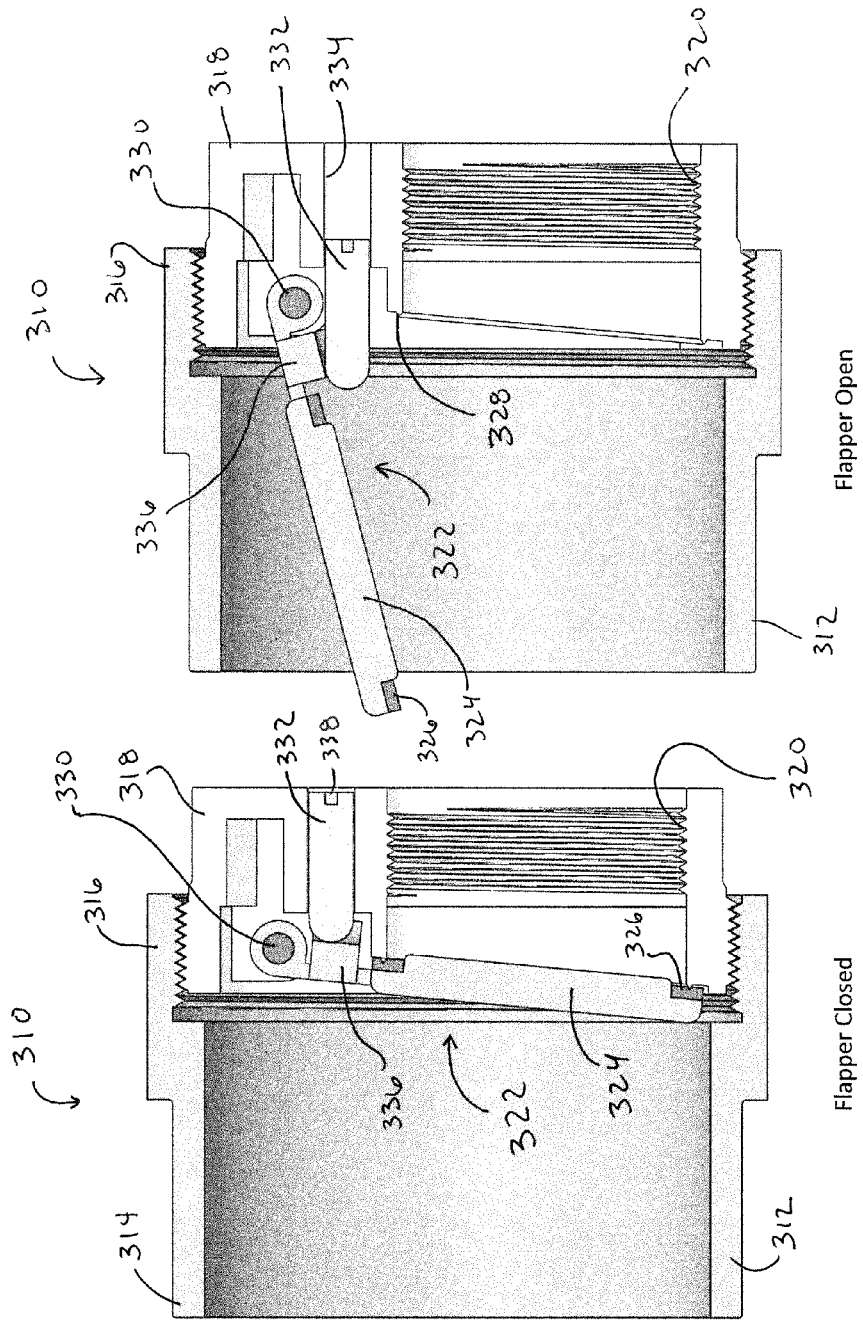
Figure 19:
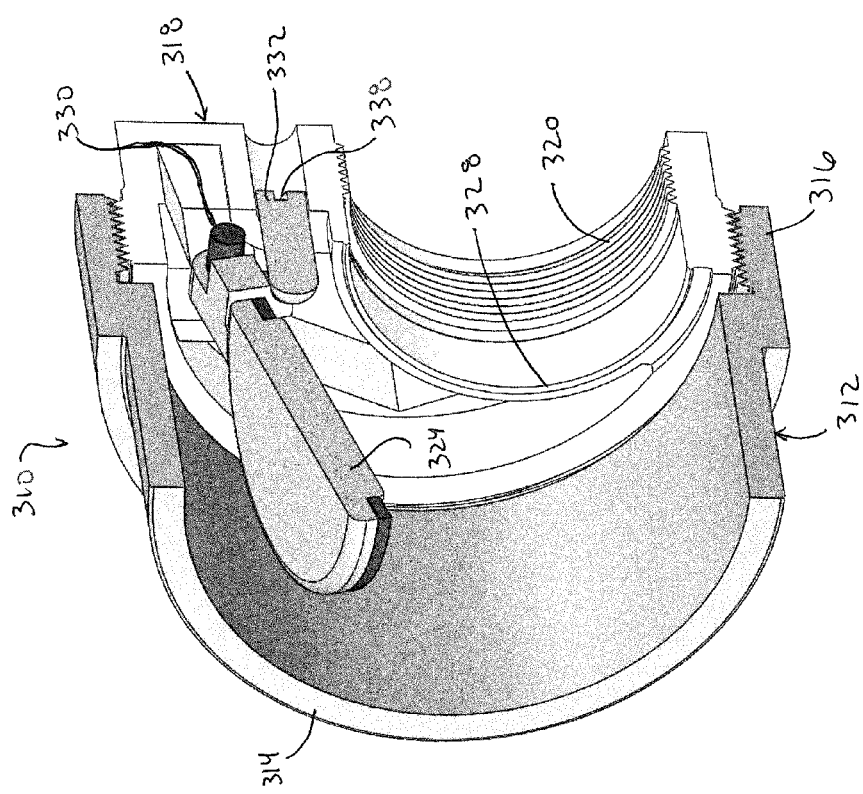

In FIG. 18, it can be seen that the member 332 extends through a bore 334 in the clean-out plug 318, and more particularly through a wall of the plug 318. The member 332 and bore 334 is preferably equipped with complementary threads to retain the member 332 in the bore 334. The interior end of the member 332 abuts a boss 336 disposed between the face 326 of the flapper 324 and the pivot 330. On the oppositely-disposed exterior end of the member 332, a slot 338 slot (or other suitable feature) is provided that enables the member 332 to be rotated into and through the plug 318, thereby pivoting the flapper 324 into the housing 312 and backing the flapper face 326 off the seat 328 to permit sewage to enter the drain port 320. The threaded engagement of the member 332 and clean-out plug 318 effectively forms a seal to prevent leakage of sewage. It is foreseeable that the threads could be omitted, and the member 332 and bore 334 could have a sliding fit therebetween that could be sealed with o-rings or another suitable sealing element. The flapper 324 may be biased into engagement with the seat 328, for example, with a torsion spring, though the hydraulic pressure of the sewage upstream of the housing 312 may sufficiently serve this purpose.

The drain port 320 is represented as having a female thread into which a plug or cap (not shown) can be threaded, though such a component is optional because the drain port 320 is fully closed by the flapper assembly 322. An additional or alternative option is to close the drain port 320 with a temporary knock-out that is preferably located within the port 320 near or at the exterior surface of the plug 318 for accessibility when the plug 318 is installed on a drain line. Such a knock-out can be adapted to fluidically close the port 320, yet be readily removed to permit fluid to flow through the port 320 once the flapper assembly 322 is operated in the manner described above.

As should be evident from the above description and FIGS. 16 through 19, the housing 312 and plug 318 are capable of meeting plumbing industry standards and draining sewage from a plumbing industry standard sewage drain line of a residential or commercial building. Furthermore, removal of the plug 318 from the housing 312 exposes the clean-out port 316 to provide a clean-out access therethrough that is preferably configured and sized to have a plumbing industry standard diameter, thereby permitting insertion of a rod or cable therethrough to remove an obstruction in a sewage drain line to which the drain clean-out assembly 310 is mounted.

While the invention has been described in terms of specific embodiments, it is apparent that other forms could be adopted by one skilled in the art. For example, the invention could be employed on drain lines and stacks of essentially any diameter, the functions of each component of the fittings could be performed by components of different construction but capable of a similar (though not necessarily equivalent) function, the fittings could differ in appearance and construction from the embodiments shown in the Figures, and appropriate materials could be substituted for those noted. Accordingly, it should be understood that the invention is not limited to the specific embodiments illustrated in the Figures. It should also be understood that the phraseology and terminology employed above are for the purpose of disclosing the illustrated embodiments, and do not necessarily serve as limitations to the scope of the invention. Instead, the scope of the invention is to be limited only by the following claims.

The invention claimed is:

1. A drain clean-out assembly comprising:
    a housing having oppositely-disposed first and second ends, the first end being configured to attach to a drain line;
    a clean-out plug removably attached to the second end of the housing, the clean-out plug comprising a drain port in fluidic communication with an interior of the housing;
    means coupled to the clean-out plug for selectively preventing and permitting flow of a fluid through the drain port thereof, the preventing and permitting means comprising a flapper assembly pivotably mounted to the clean-out plug for pivoting into the housing, the flapper assembly being operable between a first position that closes the drain port and a second position that permits fluid flow through the drain port; and
    means accessible from outside the clean-out plug for operating the preventing and permitting means.

2. The drain clean-out assembly according to claim 1, wherein the flapper assembly is directly mounted to the clean-out plug.

3. The drain clean-out assembly according to claim 1, wherein the operating means comprises a member that extends through the clean-out plug and abuts the flapper assembly to pivot the flapper assembly between the first and second positions thereof.

4. The drain clean-out assembly according to claim 1, wherein the drain port is disposed at a lower circumferential edge of the clean-out plug.

5. A method of draining an obstructed drain line to permit removal of an obstruction in the drain line, the method comprising:
    with the drain clean-out assembly according to claim 1 mounted to the drain line, moving a flapper assembly from the first position thereof to the second position thereof to drain sewage within the drain line above the obstruction;

removing the clean-out plug and the flapper assembly mounted thereto from the housing; and then gaining access to and removing the obstruction through the second end of the housing.

6. A drain clean-out assembly comprising:

a clean-out plug comprising a drain port therein; and means permanently mounted to the clean-out plug for selectively preventing and permitting drainage of a fluid through the drain port, the preventing and permitting means comprising a flapper assembly pivotably mounted to the clean-out plug, the flapper assembly being operable between a first position that closes the drain port and a second position that permits fluid flow through the drain port.

7. The drain clean-out assembly according to claim 6, wherein the flapper assembly is directly mounted to the clean-out plug.

8. The drain clean-out assembly according to claim 6, wherein the preventing and permitting means comprises a member that extends through the clean-out plug and abuts the flapper assembly to pivot the flapper assembly between the first and second positions thereof.

9. The drain clean-out assembly according to claim 6, wherein the drain port is disposed at a lower circumferential edge of the clean-out plug.

10. The drain clean-out assembly according to claim 6, further comprising a housing having oppositely-disposed first and second ends, the second end defining a clean-out port, the clean-out plug being mounted to and closing the clean-out port, wherein the flapper assembly is adapted to pivot into the housing.

11. The drain clean-out assembly according to claim 6, further comprising a member that extends through the clean-out plug and abuts the flapper assembly to pivot the flapper assembly between the first and second positions thereof.

12. A method of draining an obstructed drain line to permit removal of an obstruction in the drain line, the method comprising:

with the drain clean-out assembly according to claim 6 mounted to the drain line, operating the preventing and permitting means to selectively permit drainage through the drain port of a fluid within the drain line above the obstruction;

removing the clean-out plug from the drain line; and then gaining access to and removing the obstruction through a clean-out port exposed as a result of the removing step.

13. A method of draining an obstructed drain line to permit removal of an obstruction in the drain line, the method comprising:

with a drain clean-out assembly having a first end thereof attached to the drain line and a clean-out plug removably attached to a second end thereof, moving a flapper assembly from a first position thereof to a second position thereof to drain sewage within the drain line above the obstruction;

removing the clean-out plug and the flapper assembly from the drain line; and then gaining access to and removing the obstruction through a clean-out port exposed as a result of the removing step.

14. A drain clean-out assembly comprising:

a clean-out plug comprising a drain port therein, wherein the drain port is disposed at a lower circumferential edge of the clean-out plug; and means permanently mounted to the clean-out plug for selectively preventing and permitting drainage of a fluid through the drain port.

\* \* \* \* \*